March 5, 1968  L. E. HALL  3,372,360
COMPOSITE HOUSING FOR ELECTRICAL DEVICES
Filed Feb. 28, 1967

INVENTOR.
BY LLOYD E. HALL

ATTORNEY

United States Patent Office 3,372,360
Patented Mar. 5, 1968

3,372,360
COMPOSITE HOUSING FOR ELECTRICAL DEVICES
Lloyd E. Hall, Fullerton, Calif., assignor to Beckman Instruments, Inc., a corporation of California
Filed Feb. 28, 1967, Ser. No. 619,373
4 Claims. (Cl. 338—143)

ABSTRACT OF THE DISCLOSURE

A composite housing for electrical components formed of at least two casing members adapted to be assembled in end-to-end relationship with a separator wall supported therebetween separating the respective spaces in said casing members.

---

This invention relates generally to a composite housing for supporting electrical devices and more particularly relates to the assembly of similar shaped housing members for electrical devices such as potentiometers, rheostats, switches and the like.

It is sometimes desirable to mount electrical devices such as potentiometers, rheostats and electrical switches, in end-to-end relationship with a common shaft extending through the housings of such devices for operation as a multiple or "ganged" unit. In such an assembly a number of similar shaped case units are aligned and attached one to another by means of telescoping portions formed respectively on the ends of mating casing members. The members are assembled and a suitable clamp is attached, thereby locking them into position relative one to another. It is sometimes desirable to provide a separator wall between the respective spaces formed within the separate portions of the composite casing in order to provide greater electrical insulation or to provide shaft bearing support, or to mount other parts onto, or to aid in preventing contamination of one portion of the composite housing from that of another.

Accordingly, it is an object of the present invention to provide a separator wall which may be simply assembled and securely retained between two mating casing members.

Further objects and advantages of the invention will become apparent as the following description proceeds, and the features of novelty which characterize the invention will be pointed out with particularity in the claims annexed to and forming a part of this specification.

For a better understanding of the invention, reference may be had to the accompanying drawing in which.

Figure 1:
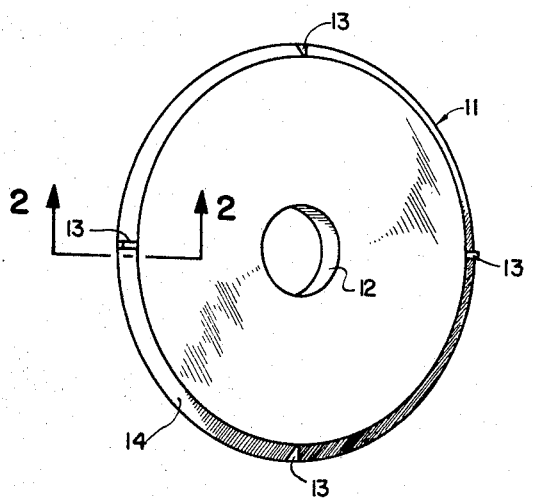
FIGURE 1 is a perspective view of a separator wall in accordance with the preferred embodiment of the invention.
Figure 2:
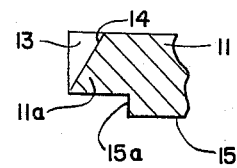
FIGURE 2 is an enlarged cross-sectional view taken along line 2—2 of FIGURE 1.

Referring now to FIGURE 1, there is provided a disc-shaped separator wall, which is preferably molded of a thermoplastic material, such as filled nylon. Centrally located within the separator wall there is provided an opening 12 for permitting a control shaft to pass through the wall from the interior of one casing to the interior of the next. Equally spaced around the outer peripheral edge of the wall are a plurality of frangible web sections 13 which may be integrally molded with the lid 11 and which protrude outwardly from a tapered or beveled peripheral edge 14 formed on the separator wall. As may best be seen in FIGURE 2, the separator wall is provided with an outwardly extending shoulder 15 of such outer dimensions that permit it to extend into and support the separator wall within the inner circumference of a casing member, as will be later described.

Figure 3:
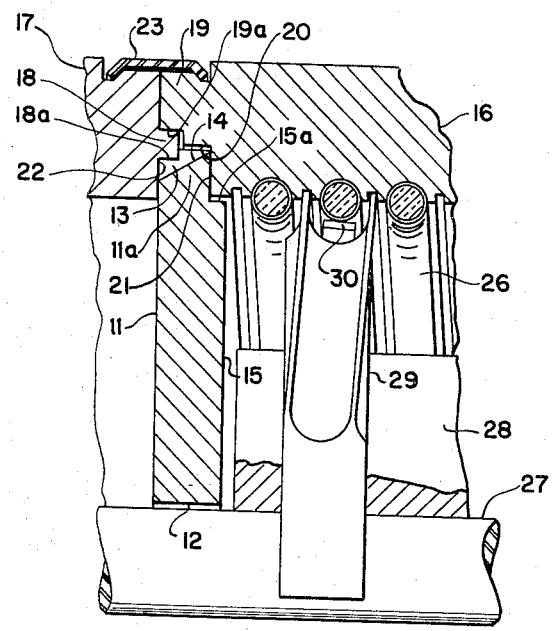
FIGURE 3 is an enlarged cross-sectional view of a variable potentiometer housing and a second electrical component housing joined together and having the separator wall of the present invention therebetween.

Referring now to FIGURE 3, the separator wall 11 is shown positioned across the cavity formed between two cylindrically shaped casing members 16 and 17. In this embodiment of the invention, the casing member 16 forms the housing for a multiturn, rotary potentiometer having a plurality of helically wound turns of resistance wire 26 mounted around the inner circumference thereof. The potentiometer includes a shaft 27 having a rotor block 28 mounted thereon and carrying a contact slider assembly 29 adapted to follow the helical turns of resistance wire 26. The slider assembly 29 makes electrical contact with the resistance wire through means of an electrical contact element 30. As shown in FIGURE 3, the shaft 27 extends through the central aperture or opening 12 from the potentiometer casing 16 into the casing 17. While, in the disclosed embodiment clearance is shown between the shaft and the opening 12, it may be desirable to support the shaft within the opening 12, in which case the opening may be provided with a bearing insert or is molded to close tolerances for supporting the shaft. The casing 17 may house a second potentiometer or other electrical component, such as a rotary switch which may be operated through the rotational motion of the shaft 27.

As will be seen in FIGURE 3, the respective housing or casing members 16 and 17 are provided with inner and outer telescoping portions 18 and 19 respectively. Portion 18 formed on the edge portion of casing 17 fits within the inner circumference 19a of the outer portion 19 formed on one end of the casing member 16. In order to support the separator wall 11 between the two casing sections at their point of juncture, the casing members 16 and 17 cooperate to form an internal circumferential recess 20 adapted to receive the peripheral edge 11a of the separator wall. The internal circumferential recess 20 is formed between the recessed end surfaces 21 and 22 formed respectively on the casing members 16 and 17.

As will be seen in FIGURE 3, the separator wall 11 is inserted into the recessed portion of casing 16 with the abutment or shoulder 15a fitting within the internal circumference of the casing 16. The peripheral edge 11a of the separator wall 11 is so positioned that the beveled portion 14 extends downwardly or inwardly toward the cavity of the second casing 17 and the frangible web sections 13 extend outwardly toward the periphery of the recess 20.

In the preferred embodiment of the invention, the lower corner or section 18a of the telescoping portion 18 partially extends into the recess 20 so that it engages and crushes the frangible webs 13 when the two casings 16 and 17 are forced into engagement. As the two casings are joined, the annular flange or edge 18a of the inner telescoping portion 18 engages and deforms the frangible web sections 13. The beveled or tapered edge 14 assures that there is sufficient room for the inner shoulder 18a of the inner telescoping portion 18 to extend into the web sections 13. The resulting interference fit presses the separator wall 11 firmly against the surface 21 of the casing 16 and thereby locks the wall securely in place.

Once assembled, the two casings 16 and 17 are secured together by clamping means, such as the band clamp 23, which is positioned around a recessed region formed on the edge surface of the casings in the embodiment disclosed. The band clamp 23 securely holds the members in compression, thereby retaining the separator wall firmly in position.

While in accordance with the patent statutes there has been described what at present is considered to be the preferred embodiment of the invention, it will be obvious to those skilled in the art that various changes and modifications may be made therein without departing from the invention and it is, therefore, the aim of the appended claims to cover all such changes and modifications as fall within the true spirit and scope of the invention.

What is claimed is:

1. In a composite electrical device comprising at least two casing members enclosing electrical components and having respectively inner and outer telescoping portions, said portions forming an internal circumferential recess at their juncture;

a separator wall dividing the space between said casing members, said wall having a peripheral edge extending into said internal circumferential recess formed between said casing members;

at least one frangible web section formed on the peripheral edge of said separator wall, said frangible web section being engaged by said inner telescoping portion of one of said casing members so that said web section is partially crushed and said separator wall is firmly retained within said recess.

2. The composite electrical device defined in claim 1 in which said peripheral edge of said separator wall is beveled and said frangible web section is a thin triangular section attached to and extending outwardly from said beveled portion of said separator wall.

3. The composite electrical device defined in claim 2 in which said inner telescoping portion of one of said casing members is provided with a lower shoulder section extending into said internal circumferential recess a distance sufficient to engage and crush said frangible web section when said inner telescoping portion of said one casing is assembled into the other casing.

4. In a composite casing for a plurality of potentiometer devices or the like, the combination comprising a plurality of casing members having respectively inner and outer telescoping portions, said portions forming an internal circumferential recess at their juncture;

a common shaft extending through said casing members for adjusting variable electrical components mounted within said casing members;

a separator wall dividing the space between said casing members, said wall having a peripheral edge extending into said internal circumferential recess formed between such casing members, said wall having an aperture therethrough permitting passage of said shaft between said respective said casing members; and frangible web sections formed on the peripheral edge of said separator wall, said frangible web sections being engaged by said inner telescoping portion of one of said casing members when assembled so that said web section is partially crushed and said separator wall is firmly retained within said recess.

References Cited

UNITED STATES PATENTS

| | | | |
|---|---|---|---|
| 2,401,037 | 5/1946 | Arvin | 338—134 |
| 2,814,702 | 11/1957 | Mucher | 338—132 |

ROBERT K. SCHAEFER, *Primary Examiner.*

H. HOHAUSER, *Assistant Examiner.*